Figure 1:
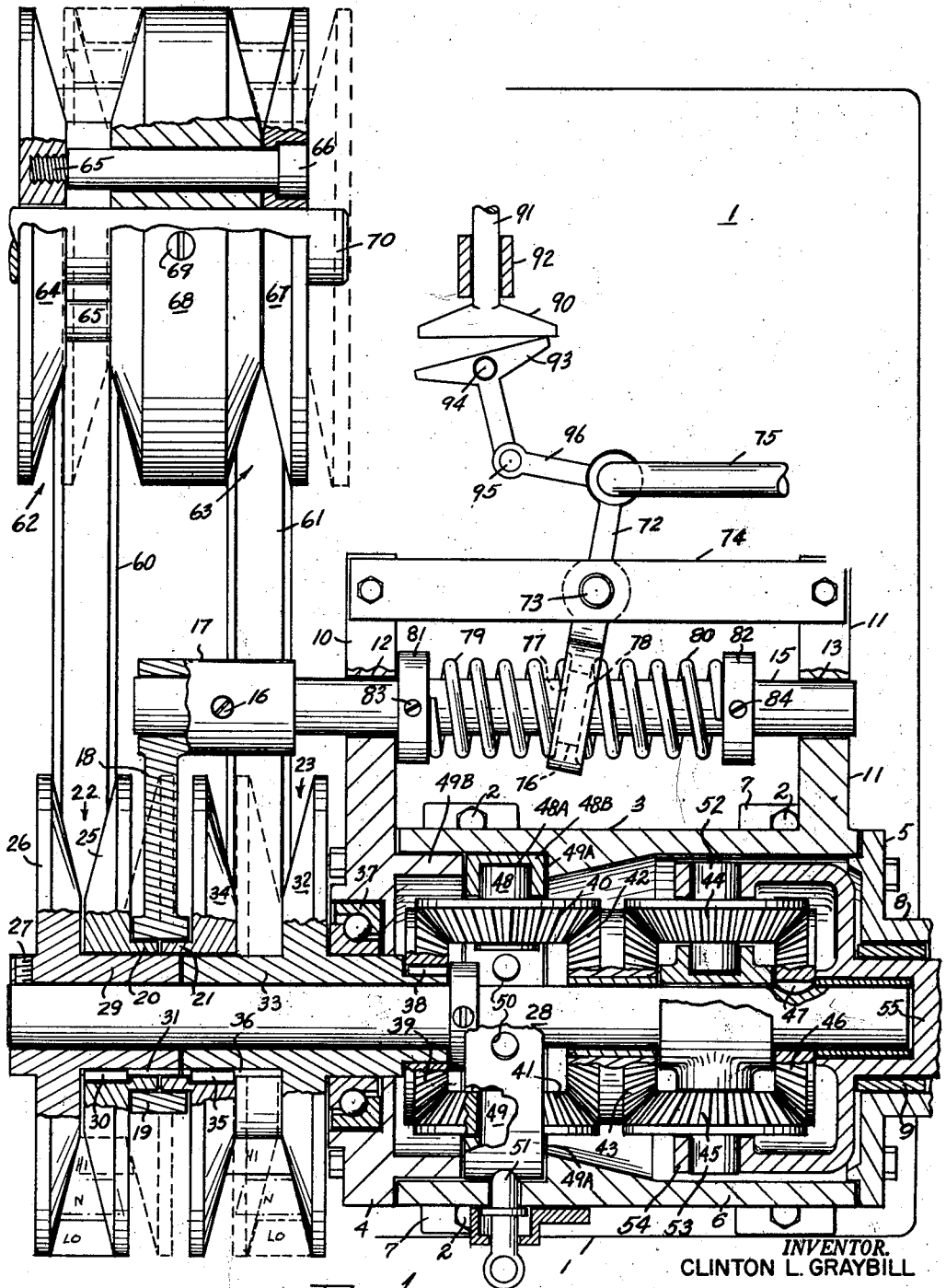

April 14, 1964     C. L. GRAYBILL     3,128,636
FULLY AUTOMATIC POWER TRANSMISSION AND VEHICLE CONTROL MEANS
Filed Oct. 5, 1960     2 Sheets-Sheet 1

INVENTOR.
CLINTON L. GRAYBILL
ATT'Y

April 14, 1964         C. L. GRAYBILL         3,128,636
FULLY AUTOMATIC POWER TRANSMISSION AND VEHICLE CONTROL MEANS
Filed Oct. 5, 1960         2 Sheets-Sheet 2

INVENTOR.
CLINTON L. GRAYBILL
BY
ATT'Y

United States Patent Office 3,128,636
Patented Apr. 14, 1964

3,128,636
FULLY AUTOMATIC POWER TRANSMISSION
AND VEHICLE CONTROL MEANS
Clinton L. Graybill, Superior, Mont., assignor to Graybill Industries, Inc., Superior, Mont., a corporation of Montana
Filed Oct. 5, 1960, Ser. No. 60,751
2 Claims. (Cl. 74—472)

One of the prinicpal objects of the present invention is to provide a transmission which is fully automatic in transmitting power from a drive shaft through two series of variable speed split pulleys and epicycle gearing to a driven shaft under all load conditions in either direction and to automatically alter the speed of rotation of the driven shaft from zero to maximum in direct proportion to the load imposed upon the engine by the driven shaft.

Another object is the provision of a single foot or hand operable means for completely controlling the transmission of speed to the driven shaft and hence to the wheels of the vehicle; the changing of the relationship of the split pulleys in one series relative to those in the other, and the application of braking power to the vehicle without the use of wheel brakes.

A further object is the provision of a transmission of this character which will automatically assume a neutral position upon release of the control means when any load is applied to the driven shaft without the use of a clutch or similar couplings.

A still further object is the incorporation in a transmission of this character of resilient means between said control means and said pulley shifting means to enable one series of pulleys to automatically and effortlessly adjust themselves relative to the pulleys of the other series without any attention on the part of the operator other than light pressure on the control means in one direction or the other when increasing load conditions are encountered by or imposed upon the driven shaft as, for example, when starting an upward climb from a level roadway or the like. This is in contrast to the operation of all other split pulleys I am aware of, wherein it is necessary to overcome tension or compression of strong springs utilized in maintaining the pulleys in proper operational relationship.

A still further object is the novel arrangement of the variable diameter pulleys of one series relative to the variable diameter pulleys of the other, wherein the driving belts will be automatically maintained in parallel relationship throughout the entire operative range of the pulleys of both series to thereby minimize the friction loads on the belts and to thus prolong their useful life, and wherein the tension on all the belts is automatically equalized throughout the entire operative range of the variable diameter pulleys, and wherein matched belts are not necessary to accomplish this result.

Figure 2:
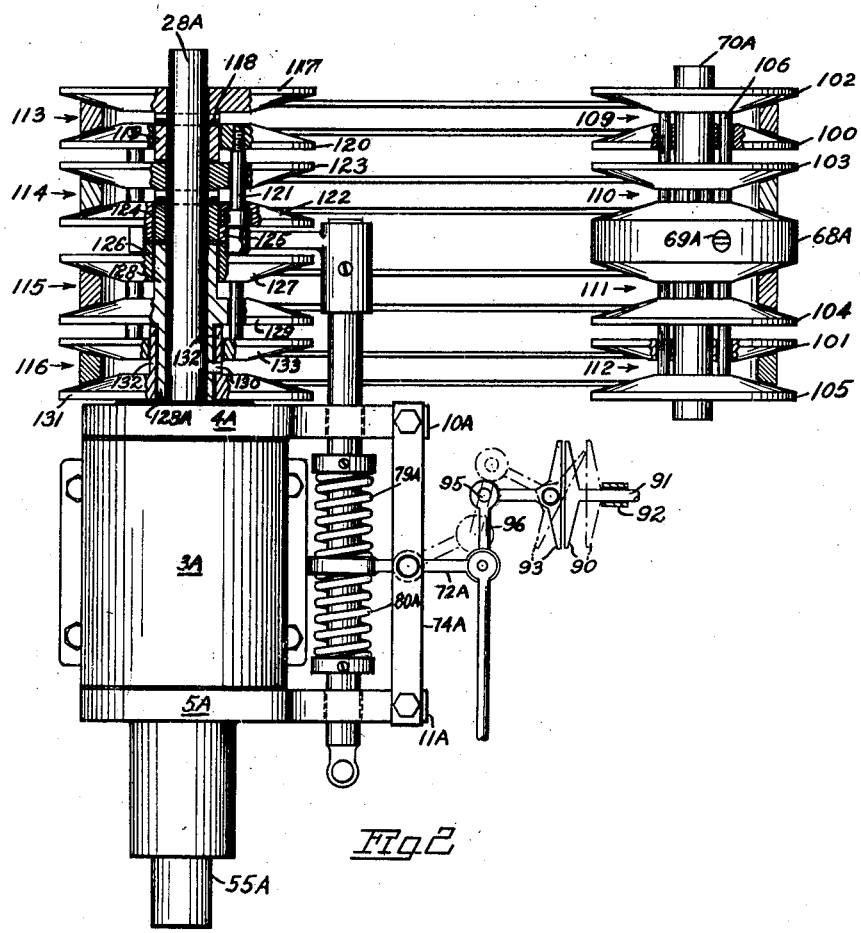

The foregoing and other objects and advantages which will become subsequently apparent reside in the details of construction and operation as more fully hereinafter described and claimed, reference being had to the accompanying drawings forming a part hereof and in which:

FIGURE 1 is a top plan view of an automatic variable speed power transmission made in accordance with my invention, and FIGURE 2 is a similar view illustrating a modified form of the invention.

With continuing reference to the drawings wherein like references of character designate like parts, and particularly FIGURE 1 thereof, reference numeral 1 indicates a platform, the floorboards of a car body, or any other horizontal supporting surface upon which the main body of the invention may be mounted in any suitable manner as for example by means of anchor bolts 2 or the like, or it may be similarly mounted to a cross member between the longitudinal frame members of a vehicle chassis, not shown. The main body of the transmission, indicated generally at 3, is a hollow casting of substantially cylindrical form closed at both of its ends by end bells 4 and 5.

The bottom wall 6 of the housing is integrated with feet or other suitable lugs 7 through which the anchor bolts pass for securement to a base as aforesaid.

The end bell 5 is integrated with or provided with a hollow tubular extension 8, provided on its interior with a bearing 9 which may be a sleeve bearing or a bearing of the roller type if desired. The end bell 4 is provided with a vertical extension 10, matching in height a similar extension 11 integrated with or secured to the top of the housing 3 at the opposite end thereof. These extensions 10 and 11 are provided with aligned bearings 12 and 13 to slidably support a manually operable and automatic shifting rod 15, to whose outer end is secured as at 16 a collar 17 integrated with a shifting collar 19 surrounding the hub portions 20 and 21 of variable diameter split pulleys indicated generally at 22 and 23 respectively.

The pulley 22 comprises a pulley member 26 secured as at 27 to a shaft 28 and provided with a hub portion 29 to which the pulley member 25 is slidably attached by a key 30 slidable in a keyway 31 in the hub 29. Similarly, the pulley 23 comprises a member 32 provided with a hub portion 33 along which the companion pulley member 34 is slidable by means of a key 35 within a keyway 36. The hub portion 33 extending beyond the other side of the pulley member 32 is journalled in a radial thrust bearing 37 within the end bell 4, and its outermost end is keyed as at 38 to a first bevel sun gear 39.

From the foregoing, it will be apparent that pulley members 25 and 34 are slidable toward and away from their companion pulley members 26 and 32 and rotatable therewith. The sun gear 39 is enmeshed at all times with a first pair of companion bevel planet gears 40 and 41, which are similarly enmeshed with a first idler gear 42 secured to or integrated with a second idling gear 43, both rotatable as a unit about the shaft 28.

The idler gear 43 is enmeshed at all times with a second pair of planet gears 44 and 45 which mesh with a second sun gear 46 keyed as at 47 to the shaft 28. The first pair of planet gears 40 and 41 are journaled by their stub shafts 48 and 49 in diametrically opposed openings 48A formed in an annulus 48B, normally fixedly held against an annular shoulder 49A within the housing 3 and against a ring 49B integrated with the end bell 4 and extending into the open end of the housing 3 as shown. The outer peripheral surface of the annulus is provided with circumferentially spaced apart openings 50 to receive a detent 51, associated with the housing 3, for holding the annulus and hence the planet gears 40 and 41 against orbiting about the shaft 28 for normal operation of the transmission, as a whole. Release of the detent 51 from the openings 50 will, of course, render the transmission inoperative by permitting such orbital rotation when it is desired or necessary to push or tow the vehicle. The second pair of planet gears 44 and 45 are journaled by their shafts 52 and 53 within a yoke 54 integrated with a power take off or vehicle drive shaft 55.

From the foregoing it will be apparent that rotation of the shaft 28 in a clockwise direction will impart the same rotation to the second sun gear 46 which through the medium of the second pair of planet gears 44 and 45 will impart counter clockwise rotation to the idling gears 42 and 43 and the idling gear 42 will thus, through the medium of the first pair of planet gears 40 and 41, also impart clockwise rotation to the first sun gear 39.

Two driving V-belts 60 and 61 are entrained respectively over the variable diameter pulleys 22 and 23 and also over similar driving pulleys indicated generally at 62 and 63. The pulley 62 comprises a member 64 secured as at 65 and 66 to a member 67 of the pulley 63 and both members 64 and 67 cooperate with a central pulley member 68 secured in any suitable manner as at 69 to an engine shaft 70. From the foregoing, it will be apparent that movement of the pulley members 64 and 67 as a unit toward or away from the central member 68 will be equal to similar movement of the pulley members 25 and 34 relative to their companion pulley members 26 and 32, respectively, to thus retain the belts 60 and 61 in parallelism during any and all operations. For effecting such movement of the pulley members 64 and 67, and 25 and 34, I provide a control lever 72 pivotally attached as at 73 to a cross member 74 interconnecting the top ends of the vertical members 10 and 11. The top end of the lever 72 is adapted for attachment to suitable linkage 75 connected to a foot pedal or other actuating means not shown. The bottom portion of the lever 72 is provided with a relatively large opening 76 loosely surrounding the shifting rod 15 and arranged concentrically with two recesses 77 and 78 to provide seats for the inner ends of coil springs 79 and 80 whose outer ends bear against collars 81 and 82 respectively, adjustably secured as at 83 and 84 to the shaft 15.

The operation of the invention thus far described is as follows:

Assuming that the engine shaft 70 is in clockwise rotation as viewed from the right and that the control lever 72 has been moved into a vertical or zero position. The resilient pressure of the spring 80 against the collar 82 will cause the spacing between the members 25 and 26 of pulley 22, 64 and 68 of pulley 62, and 34 and 32 of pulley 23, to become equal, and thus put the first and second sun gears 39 and 46 in equal speeds of clockwise rotation, because the gear 46 is keyed to the shaft 28 which is driven at a certain speed by the pulley 22 and because the gear 39 is driven at the same speed by the pulley 23 it will thus be seen that the idler gears 42 and 43 will also be put into equal speeds of counter clockwise rotation to thus render the driven shaft and hence the power take off shaft inoperative.

To put the mechanism or rather the drive shaft 55 in reverse or counter clockwise rotation, it is merely necessary to position the parts as shown in full lines in FIGURE 1 by pulling the top of the lever 72 to the right as shown, whereby such movement will move the pulley member 25 against the member 26 of pulley 22 and the pulley member 34 away from the member 32 of pulley 23. Accordingly, the effective diameter of the driving pulley 62 will be decreased and the effective diameter of pulley 22 will be increased. Conversely, the effective diameter of pulley 23 will be decreased as the effective diameter of pulley 63 is increased.

The resultant increase in speed of pulley 23 and first sun gear 39 in a clockwise direction will, through the medium of the first pair of planet gears 40 and 41 rotate the idler gears 42 and 43 in a counter clockwise direction at a higher speed, and the retarded speed of rotation of the second sun gear 46, because of its connection through the shaft 28 with the pulley 22, will cause the second pair of planet gears 44 and 45 to orbit in a counter clockwise direction and through the medium of their shafts 52 and 53 impart the same rotation to the yoke 54 and the output shaft 55.

To put the mechanism in forward drive, the operation just described is reversed by tilting the lever 72 to the left as viewed in FIGURE 1. Such movement will move the pulley member 25 away from the member 26 in pulley 22 and will also move pulley member 34 against pulley member 32 in pulley 23. The resultant loosening of the belt 60 will cause the belt to move outwardly to the maximum effective diameter of the pulley 62 and the resultant tightening of belt 61 will pull it down to the minimum effective diameter of pulley 63.

The resultant increase in speed of pulley 22 and the rotation of second sun gear 46 will cause the second pair of planet gears 44 and 45 to orbit in a clockwise direction about the idler gears 42 and 43, now running at a retarded speed, and such orbiting of the gears 44 and 45 will, through the medium of their shafts 52 and 53, impart clockwise rotation to the output shaft 55.

To control engine acceleration and deceleration throughout the operations just described and the fully automatic operation to be hereinafter described, I provide a cam member 90 connected by suitable linkage 91, slidably mounted in a slide bearing 92, to the throttle valve of the carburetor of an engine, not shown, but whose shaft, as previously stated, is indicated at 70. Cooperating with the cam member 90 is a companion cam member 93 pivotally mounted as at 94 to any suitable support and pivotally connected as at 95 to a link 96 connected to the top end of the control lever 72 or to the end of the linkage 75 connected thereto. In the position shown, the cam 93 has been rocked about its pivot 94 to thereby apply forward thrust on the linkage 91 to accelerate the engine during reverse operation of the drive shaft 55. When the control lever 72 is put into a neutral or zero vertical position, the cam 93 will assume a horizontal position and cause the cam member 90 to return to a position of engine-idling operation. When the control lever 72 is swung in the opposite direction off the vertical, the cam 93 will, of course, again advance the linkage 91 to accelerate the engine for forward operation of the drive shaft.

In the modified form of the invention illustrated in FIGURE 2 the housing 3A, its end bells 4A and 5A, vertical extensions 10A and 11A, cross member 74A, control lever 72A, engine throttle control mechanism actuated by the control lever, the driven shaft 28A and the power take off or vehicle drive shaft 55A are identical with the corresponding parts shown and described in FIGURE 1.

A central pulley member 68A is secured as at 69A to the engine shaft 70A. Also fixedly secured to the engine shaft in any suitable manner are two pulley members 100 and 101 for rotation with the shaft and the central pulley member. Four cooperating pulley members 102, 103, 104 and 105 are interconnected by tie rods 106 and 107 which are slidable through the central pulley member 68A. From the foregoing it will be readily apparent that the pulley members 102–105 are movable as a unit toward and away from their companion pulley members. In effect and for convenience in further description, four separate driving pulleys are thus provided and indicated generally at 109, 110, 111, and 112. Matching driven pulleys indicated generally at 113, 114, 115 and 116, respectively, are associated with the driven shaft 28A. The pulley 113 comprises a pulley member 117 secured as at 118 to the driven shaft 28A and provided with a hub portion 119 upon which a movable companion member 120 is slidably mounted and interconnected as at 121 with the slidable pulley member 122 of the pulley 114 wherein the pulley member 123 is provided with a hub 124 along which the pulley member 122 is slidable. This last-mentioned pulley member 122 is provided with a hub 125 matching the hub 126 of the slidable pulley member 127 of pulley 115. This pulley member 127 is slidable along one hub portion 128 of the pulley member 129 of pulley 115. To the oppositely extended hub portion 128A of pulley member 129 is secured as at 130, one pulley member 131 of pulley 116 provided with a hub portion 132 along which is slidably mounted a companion pulley member 133. The interconnected pulley members 120, 122, 127 and 133 are thus manually movable as a unit toward and away from their companion pulley members by the shifting collar 19A to vary their effective diameters which will correspondingly change the effective diameters of the driving pulleys 109–112.

The fully automatic operational features of both forms of the invention herein shown and described reside in the spring members 79, 80, 79A and 80A, the shifting collar 19, 19A, the two series of variable diameter pulleys and their V-belts, and the operative connection of one of the pulley members in the second series to one of the gears in the differential gear train and the operative connection of another pulley member in said second series to the driven shaft and through the shaft to another of the gears in the differential gear train.

With the engine shaft and driving and driven pulleys in rotation, the belts and pulley members in both series will assume a neutral position allowing the engine to run at idling speed while the control lever 72 retains its vertical position which will allow the cams 92 and 93 to assume the full line idling position as aforesaid and as shown in full lines in FIGURE 2. To start the vehicle in forward motion, it is merely necessary to operate the hand or foot control to move the control lever 72 off the vertical into the broken line position shown in FIGURE 2 which will immediately accelerate the engine and at the same time compress the spring 80, 80A which will cause the pulley members to gradually assume relative positions to drive the vehicle at high speed under normal load conditions.

When the vehicle encounters an upgrade and the torque load on the vehicle drive shaft 55 is thereby increased, the spring 79, 79A due to the additional load and pull on the belts, will compress and allow the belts and pulleys to shift down to a higher torque ratio. If the control rod is released under these conditions, or any load conditions, the belts and the pulleys will quickly adjust themselves to a neutral position and the engine will resume an idling speed. The same automatic functions occur in reverse operation of the vehicle.

While I have shown particular forms of embodiment of my invention, I am aware that many minor changes therein will readily suggest themselves to others skilled in the art without departing from the spirit and scope of the invention.

Having thus described my invention what I claim as new and desire to protect by Letters Patent is:

1. Automatic transmission comprising,
   a closed housing,
   a driven shaft rotatably mounted within the housing and extending outwardly from one end thereof,
   a vehicle drive shaft extending outwardly from the opposite end of said housing,
   a first epicyclic gear train disposed within the housing and including an annulus and two gears of said train rotatably carried by the annulus,
   a second epicyclic gear train disposed within said housing,
   both of said gear trains having a driving connection with each other,
   detent means associated with said housing and engageable with said annulus for holding said annulus to effect normal operation of the transmission or for selectively releasing the annulus to render the transmission inoperative,
   a driving shaft driven by an engine operatively controlled by a throttle valve linkage,
   a first series of variable diameter split pulleys associated with and driven by said engine drive shaft,
   a second series of variable diameter pulleys having a driving connection with said driven shaft at said outwardly extending end thereof and with said first and second epicyclic gear trains,
   each pulley in each of said series comprising one pulley member movable toward and away from a companion member pulley,
   belt means operatively interconnecting the pulleys of said first and second series,
   a shifting rod,
   means carried by said housing slidably supporting said shifting rod for reciprocal motion relative to the housing,
   means interconnecting one end of said shifting rod and said movable pulley members in said second series,
   a control lever rockably mounted on said shifting rod supporting means,
   cam means interconnecting said control lever with said engine throttle valve linkage and operable by said control lever to accelerate said engine upon movement of the control lever in either of two directions,
   means normally urging said control lever in a non-accelerating position and also normally urging the pulley members in both of said series to neutral positions of equal effective diameters, whereby movement of said control lever in one direction, will accelerate the engine to cause movement of said pulley members into position to impart high-speed rotation to said vehicle drive shaft under normal load conditions, and whereby when the vehicle drive shaft encounters increased torque loads the additional pulling stresses on said belt means will shift said pulley members to a higher torque ratio at the same time moving said control lever in the other of said directions to maintain engine acceleration.

2. Automatic power transmission comprising,
   a housing,
   means closing both ends of the housing,
   a driven shaft rotatably mounted within the housing and extending outwardly from one end thereof,
   a vehicle shaft extending outwardly from the opposite end of said housing,
   a first epicyclic gear train disposed within the housing and comprising a first sun gear rotatable relative to said driven shaft,
   a first idler gear rotatable about said driven shaft,
   an annulus disposed within said housing,
   two planet gears rotatably carried by said annulus and enmeshed at all times with said first sun gear and with said first idler gear and operable about axes of rotation fixed by said housing,
   a yoke rotatable within said housing rotatably supporting the opposite end of said driven shaft and terminating in said vehicle drive shaft extending outwardly from the opposite end of said housing,
   a second epicyclic gear train within said housing having a driving connection with said first gear train and comprising a second idler gear integrated with said first idler gear of said first epicyclic gear train and rotatable therewith about said driven shaft,
   a second sun gear secured to said driven shaft,
   two planet gears carried by said yoke for orbital rotation about said drive shaft and enmeshed at all times with said second idler gear and with said second sun gear,
   detent means associated with said housing and engageable with said annulus for holding said annulus to effect normal operation of the transmission or for selectively releasing the annulus to render the transmission inoperative,
   a driving shaft driven by an engine operatively controlled by a throttle valve linkage,
   a first series of variable diameter split pulleys associated with and driven by said engine shaft,
   a second series of variable diameter split pulleys associated with said driven shaft and having a driving connection with said first series of pulleys,
   each pulley in each of said series comprising one pulley member movable toward and away from a companion pulley member,
   a shifting rod,
   means carried by said housing slidably supporting said shifting rod for reciprocal motion relative to the housing,
   means interconnecting one end of said shifting rod and said movable pulley members in said second series, a control lever rockably mounted on said shifting rod supporting means, cam means interconnecting said control lever with said engine throttle valve linkage and operable by said control lever to accelerate said engine upon movement of the control lever in either of two directions, two spaced apart collars adjustably secured to said shifting rod, resilient means interposed between said control lever and said collars normally urging said control lever in a non-accelerating position and normally urging the pulley members in both of said series to neutral positions or equal effective diameters, whereby acceleration of the engine by moving said control lever in one of said directions and compressing one of said resilient means in that direction will move said pulley members into relative positions to impart high-speed rotation to said vehicle drive shaft under normal torque load conditions, and whereby the vehicle drive shaft upon encountering increased torque loads resulting in additional pulling stresses on said belt means, will shift said pulley members to a higher torque ratio at the same time moving said control lever in the other of said directions to maintain engine acceleration.

References Cited in the file of this patent

UNITED STATES PATENTS

| | | |
|---|---|---|
| 596,281 | Spaulding | Dec. 28, 1897 |
| 1,727,232 | Farrell | Sept. 3, 1929 |
| 1,926,269 | Easter | Sept. 12, 1933 |
| 2,150,456 | Perrine | Mar. 14, 1939 |
| 2,245,392 | Drill | June 10, 1941 |
| 2,472,341 | Roach et al. | June 7, 1949 |
| 2,611,227 | Keller | Sept. 23, 1952 |
| 2,760,386 | Southwick | Aug. 28, 1956 |
| 2,884,810 | Chapman | May 5, 1959 |
| 2,932,216 | Schou | Apr. 12, 1960 |
| 2,933,952 | Schou | Apr. 26, 1960 |
| 2,977,816 | Rice | Apr. 4, 1961 |
| 3,017,785 | Van der Brugghen et al. | Jan. 23, 1962 |

FOREIGN PATENTS

| | | |
|---|---|---|
| 700,783 | Great Britain | Dec. 9, 1953 |